United States Patent
Koppich et al.

(10) Patent No.: US 7,084,994 B1
(45) Date of Patent: Aug. 1, 2006

(54) HOME PRINTING FROM INTERNET SOURCES

(75) Inventors: George Koppich, Palos Verdes Estates, CA (US); Michael Lee Yeung, Mission Viejo, CA (US); Don Francis Purpura, Yorba Linda, CA (US); Paul Nicholas Gacek, Laguna Beach, CA (US); Tapani Otala, San Jose, CA (US); Douglas Richard Barr, Laguna Beach, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/357,585

(22) Filed: Jul. 20, 1999

(51) Int. Cl.
*G06F 13/00* (2006.01)
*G06F 15/00* (2006.01)

(52) U.S. Cl. .................. 358/1.15; 709/206; 709/239; 709/240; 725/86; 725/153; 725/109; 725/110; 725/133; 725/141

(58) Field of Classification Search ............... 358/1.15; 709/206, 239, 240; 725/86–153
See application file for complete search history.

(56) References Cited

U.S. PATENT DOCUMENTS

| | | | | |
|---|---|---|---|---|
| 5,530,758 A | * | 6/1996 | Marino et al. | 713/150 |
| 5,793,414 A | * | 8/1998 | Shaffer | 725/133 |
| 5,819,032 A | * | 10/1998 | de Vries et al. | 709/250 |
| 5,832,301 A | * | 11/1998 | Yamaguchi | 710/48 |
| 5,864,823 A | * | 1/1999 | Levitan | 705/14 |
| 5,905,521 A | * | 5/1999 | Gatto et al. | 725/95 |
| 6,076,076 A | * | 6/2000 | Gottfreid | 705/45 |
| 6,216,157 B1 | * | 4/2001 | Vishwanath et al. | 709/208 |
| 6,285,685 B1 | * | 9/2001 | Bum | 370/474 |
| 6,367,009 B1 | * | 4/2002 | Davis et al. | 713/166 |
| 6,525,831 B1 | * | 2/2003 | Evans, IV | 358/1.15 |
| 6,543,052 B1 | * | 4/2003 | Ogasawara | 725/60 |
| 2003/0040962 A1 | * | 2/2003 | Lewis | 705/14 |

FOREIGN PATENT DOCUMENTS

| | | |
|---|---|---|
| EP | 0851367 | 12/1997 |
| EP | 0 844 788 | 5/1998 |
| GB | 2332543 | 11/1998 |
| JP | 11143670 | 11/1997 |
| JP | 11203075 | 1/1998 |
| JP | 11327863 | 5/1998 |
| JP | 11353145 | 12/1998 |
| WO | 99/35753 | 7/1999 |

OTHER PUBLICATIONS

RFC 2565: "Internet Printing Protocol/ 1.0: Model and Semantics", <ftp://ftp.pwg.org/pub/pwg/ipp/published-ipp–rfcs/rfc2565.txt>, (visited Jul. 19, 1999) 32 pages.

RFC 2566: "Internet Printing Protocol/ 1.0: Encoding and Transport", <ftp://ftp.pwg.org/pub/pwg/ipp/published-ipp–rfcs/rfc2566.txt>, (visited Jul. 19, 1999) 150 pages.

(Continued)

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

Internet-based printing to a home printer in which the print job is pre-rasterized at the cable head end and sent in rasterized format to the set top box. Because the print job is pre-rasterized at the cable head end, and not at the set top box, resources are not wasted at the set top box when they are more readily available at the cable head end. In addition, because of the high speed communication network already in existence between the cable head end and the set top box, even large pre-rasterized print jobs can be transmitted to the set top box in reasonable amounts of time, meaning more quickly than a situation in which it was the set top box that performed rasterization.

13 Claims, 12 Drawing Sheets

OTHER PUBLICATIONS

RFC 2567: "Design Goals for an Internet Printing Protocol", <ftp://ftp.pwg.org/pub/pwg/ipp/published–ipp–rfcs/rfc2567.txt>, (visited Jul. 19, 1999) 38 pages.

RFC 2568: "Rationale for the Structure of the Model and Protocol for the Internet Printing Protocol", <ftp://ftp.pwg.org/pub/pwg/ipp/ published–ipp–rfcs/rfc2565.txt>, (visited Jul. 19, 1999) 9 pages.

* cited by examiner

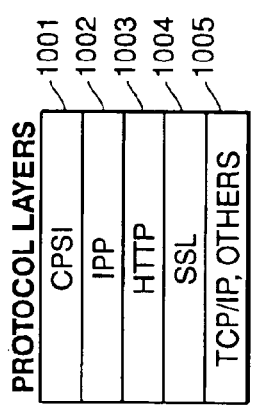
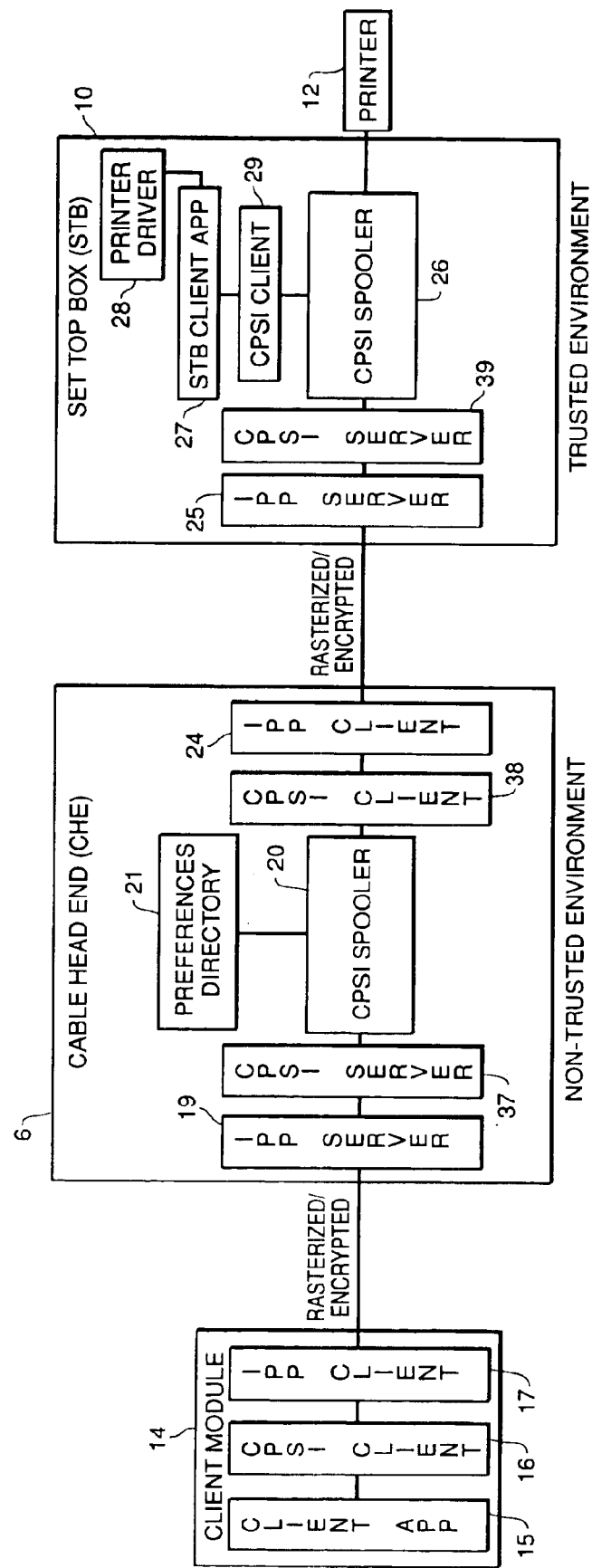

HOME PRINTING FROM INTERNET SOURCES

BACKGROUND OF THE INVENTION

1. Field of the Invention

The present invention relates to printing from an internet based source onto a printer located at a user's home. Specifically contemplated is a situation in which the home printer is connected to a set top box which, in turn, is connected to a cable network, with the cable network accepting print jobs from the internet-based source and directing the print job to the home printer.

2. Description of the Related Art

With increasing availability of cable television networks that also provide digital data to a home subscriber, a new product is becoming increasingly common in homes: a set top box which provides access not only to conventional cable television, but also provides access to internet-based digital data. Examples of existing set top boxes include those manufactured by Scientific Atlanta under the tradename "Explorer 2000", General Instrument under the tradename "DCT 5000+", and Motorola, under the tradename "StreamMaster". Set top boxes are home-based, and are connected to a cable provider (often referred to as the "cable head end") over a high speed digital cable network. Set top boxes provide efficient delivery of cable television broadcasts from the cable head end. In addition, through an internet connection at the cable head end, set top boxes also provide the ability for a home user to access the internet through web browser software included in the set top box.

In a related development, sophisticated printers such as bubble jet printers, designed specifically for home use, have become increasingly affordable, and have enjoyed widespread acceptance. It has therefore been considered to provide a connection between a set top box and a printer, thereby to allow a home user of a set top box to initiate printout of documents directly on his printer without the need for a separate computer.

In an unrelated development in the field of printing, the subject of distributed printing has recently attracted attention. Conventional paradigms of printing allow for printout to a printer connected to the same computer or network as the source of the print job. According to distributed printing, the source of the print job need not be connecte to the same network, or be at the same location as, the destination printer. An Internet Printing Protocol has been proposed that allows for distributed printing over the internet, that is, from an internet-based source to an internet-based destination. The following documents describe the Internet Printing Protocol, and are incorporated herein by reference: RFC 2568, "Rationale for the Structure of the Model and Protocol for the Internet Printing Protocol", April 1999; RFC 2567, "Design Goals for an Internet Printing Protocol", April, 1999; RFC 2566, "Internet Printing Protocol/1.0: Model and Semantics", April 1999; RFC 2565, "Internet Printing Protocol/1.0: Encoding and Transport", April 1999; and RFC 2569, "Mapping between LPD ad IPP Protocols", April 1999.

Distributed printing has not yet been considered in the field of set top boxes, primarily because the set top box (and any attached printer) is not actually connected to the internet. Rather, it is the cable head end that is connected to the internet; thus, distributed printing techniques like the Internet Printing Protocol are not able to address print jobs from an internet-based source to the set top box. The assignee of the present application is currently engaged in development of internet-based printing over a digital cable network to a set top box, for example, U.S. application entitled "Internet-Based Push Printing Over Cable Network", filed Jul. 20, 1999.

One problem encountered in such a proposal is the limited computing power currently available in set top boxes. Specifically, set top boxes must be designed to provide access not only to cable television, but also to the internet, and must be designed for these criteria at an affordable price. Accordingly, the computing power included in set top boxes is deliberately limited, so as to ensure affordability with reasonable function.

Because of limited resources in the set top box, however, print jobs routed to the set top box can not ordinarily be executed by the set top box without undue delays and other frustrations to the user, all resulting directly from limited resources. What is needed, therefore, is a more efficient way of printing via a digital cable network on a printer connected to a home user's set top box, for a print job originated from an internet based source.

SUMMARY OF THE INVENTION

It is an object of the present invention to address the foregoing difficulties by providing for printout of an internet-based print job at a printer connected to a home user's set top box, in which the print job is pre-rasterized at the cable head end and sent via the digital cable network in rasterized format to the set top box. Because the print job is pre-rasterized at the cable head end, and not at the set top box, resources are not wasted at the set top box when they are more readily available at the cable head end. In addition, because of the high speed communication network already in existence between the cable head end and the set top box, even large pre-rasterized print jobs can be transmitted to the set top box in reasonable amounts of time. "Reasonable" in this situation means ordinarily more quickly than a situation in which it was the set top box that performed rasterization of the print job.

Thus, in one aspect the invention involves receipt of a print job from an internet based source at the cable head end. The print job is received in a printer-independent format, such as a high level printer description language, and also includes address information designating one or more home printers connected to respective set top boxes for which printout of the print job is desired. Upon receipt at the cable head end, and based on the address information, a user directory is accessed so as to determine user preferences including information identifying the type and configuration of the printer (or printers) involved. A logical software printer is created at the cable head end, and a print driver corresponding to the printer identity is executed in the logical printer. The logical printer is used to render the printer-independent print job into a rasterized bit map image that is specific for the ultimate destination printer. The rasterized bit map image is thereafter transferred over the cable network to the set top box to which the destination printer is connected. At the set top box, another logical printer is created with a simplified print driver that accepts rasterized bit map print jobs. The rasterized bit map print job is accepted by the logical printer and transmitted to the printer for visual printout thereby.

In preferred aspects, the rasterized bit map image created at the cable head end includes all needed printer commands for the target printer, and in addition, formats the bit map data so that it is specific to the printer in question. For example, many printers designed for home use require printer-specific commands that load paper, eject paper, advance paper, and the like. Those printer commands are included in the rasterized bit map data created by the logical printer at the cable head end. In addition, the rasterized bit map print data is formatted in whatever form is needed by the target printer. For example, many printers designed for home use require out-of-sequence print data for each of plural different colors printed by the printer, so as to accommodate physical offsets in print positions of one color relative to another. Again, the rasterized bit map data created by the logical printer at the cable head end preferably formats the data to its needed format.

In further preferred aspects, the cable head end automatically detects the identification information for the type and configuration of printer attached to the cable head end, by requesting such information from the set top box, and thereafter automatically obtains a suitable print driver, such as by downloading over the internet. In this way, it is possible to update user preference information so that future print jobs addressed to the same user may be printed with increased efficiency.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 10 is a block diagram showing protocol layers which are utilized during secure push-printing.

FIG. 11 is a block diagram illustrating an alternate method of secure printing of print data.

DETAILED DESCRIPTION OF THE PREFERRED EMBODIMENTS

Figure 1:
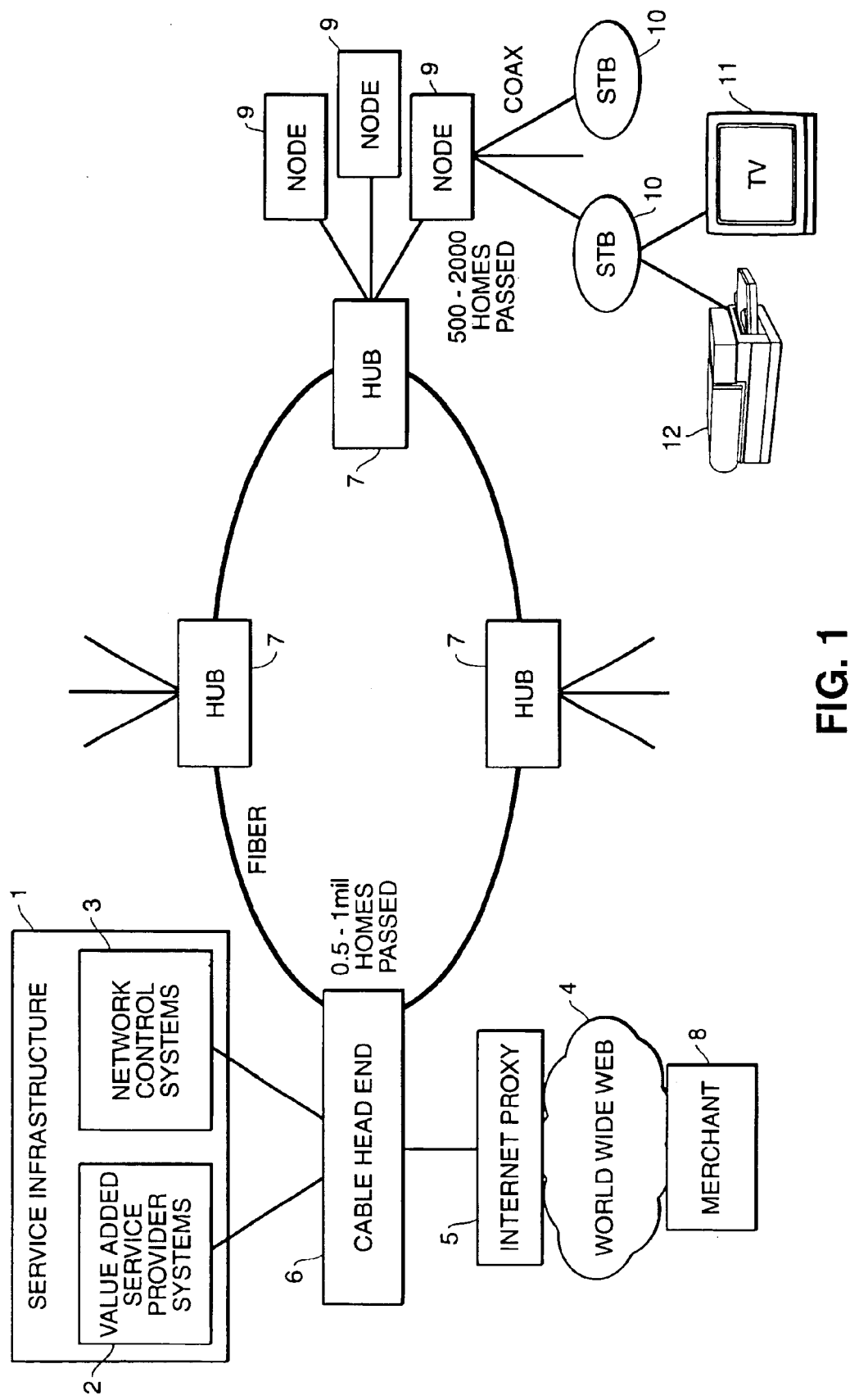
FIG. 1 is a representation of a cable broadband network embodying the present invention.

FIG. 1 illustrates a regional broadband digital cable network connected to the internet and utilizing the present invention. The network is capable of delivering analog and digital broadcasts, secure analog and digital broadcasts, analog and digital pay-per-view, analog and digital impulse pay-per-view, digital near video on demand, one-way real-time datagram (broadcast IP data packets), and two-way real-time datagram (addressed IP data packets).

As shown in FIG. 1, the above-listed services may be delivered from service infrastructure 1 located at the cable head-end, the infrastructure including value-added service provider systems 2 and network control systems 3. Value-added service provider systems 2 include digital satellite distribution systems, applications executing on cable servers (such as special-purpose applications like subscriber service application, content gather applications, etc.), digital media servers outputting MPEG-2 datastreams, and an application data carousel defined by the DSM-CC specification. Network control systems 2, consisting of the Broadcast Control Suite and the PowerKey Control Suite, provide management and control for the services supported by the broadband network.

Alternatively, services may be delivered from World Wide Web (WWW) 4 through internet proxy 5, for example, from remote merchants like merchant 8. Examples of merchants include banking, retailing, utilities, and the like.

In either case, the services are delivered to Cable Head End (CHE) 6, which serves as an interface between the service providers and the rest of the broadband network.

In particular, CHE 6, which is responsible for providing services to 500,000 to 1,000,000 homes, is connected via fiber optic cabling to hubs 7, which are connected to CHE 6 or other hubs 7. Each hub 7 is, in turn, connected to at least one node 9, also using fiber optic cabling. Coaxial cable is then used to connect each node to Set Top Boxes 10 (STB's) of 500 to 2000 homes. Finally, each STB 10 is connected to television 11, printer 12 or both. Accordingly, services are delivered from a service provider to CHE 6, to one or more hubs 7, to node 9, to STB 10 and to television 11 or printer 12.

It should be noted that, by virtue of the foregoing arrangement, service infrastructure 1 may be distributed among CHE 6, hubs 7, or other facilities.

[Software Architecture]

Figure 2:
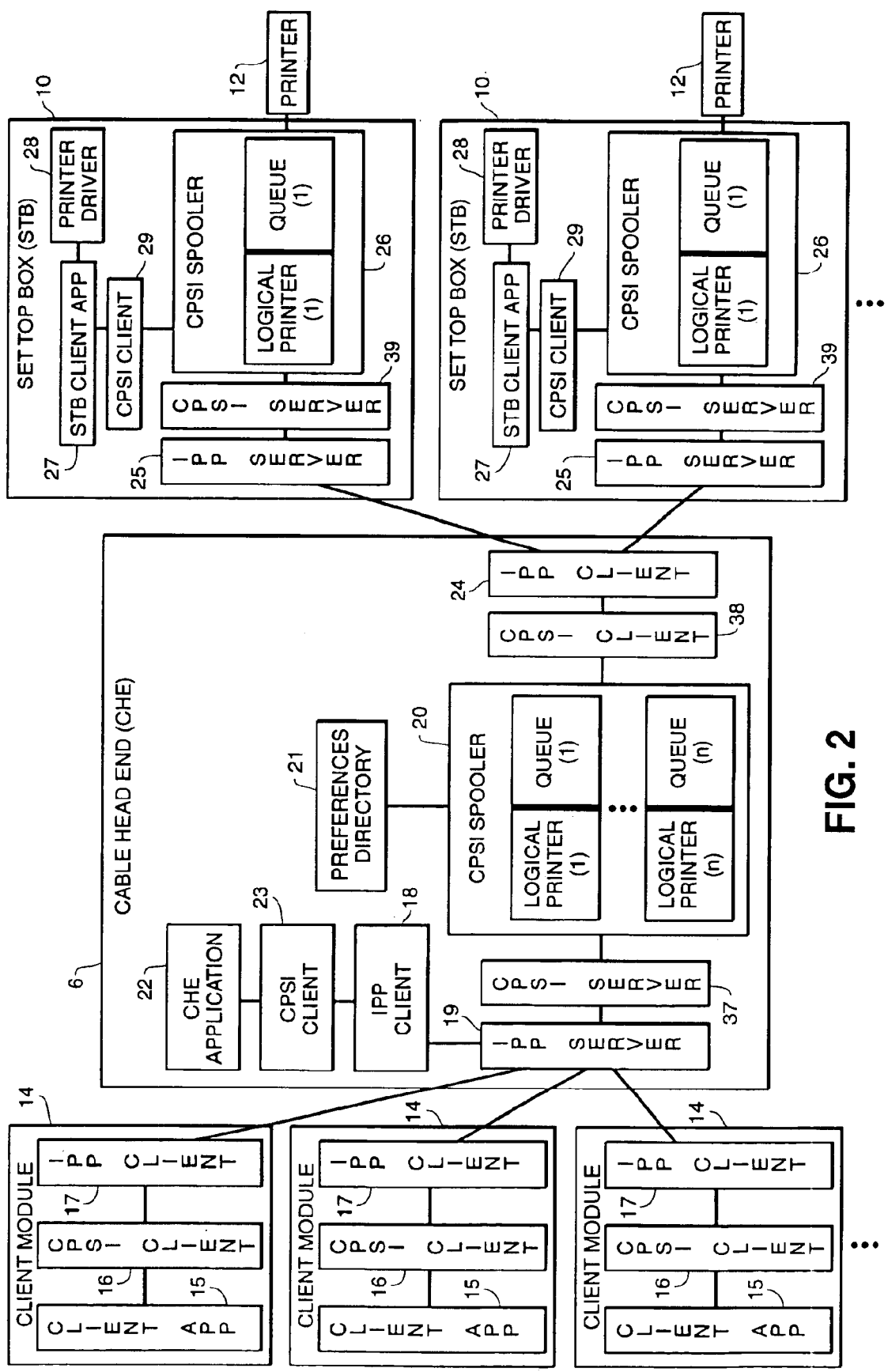
FIG. 2 is a representation of a printing architecture.

FIG. 2 illustrates several relevant components of service infrastructure 1, CHE 6, and STB 10, as well as relevant internet components of remote client modules connected to CHE 6 via internet proxy 5. In particular, three representative client modules 14 are illustrated (although many more are contemplated in an actual implementation), each client module 14 being located remotely of CHE 6 and connected to CHE 6 over the internet via internet proxy S. Client modules 14 may be executing on servers operated by a bank, a newspaper, or other entity from which a user may desire print data. Of course, more than three client modules 14 may be connected to the architecture shown in FIG. 2.

Each client module 14 includes client application 15, a Cable Printing Services Infrastructure (CPSI) client 16, and Internet Printing Protocol (IPP) client 17. Each client application 15 is preferably specific to services being performed at the client module, such as banking services, newspaper services, and the like. Other client-specific applications may also be executed at the client modules, such as applications that generate data or access databases for printout. Client application 15 communicates with CPSI client 16 using an application programming interface (API).

CPSI client 16 delivers print data received from client application 15 to CHE 6 through IPP client 17. Correspondingly, CHE 6 is provided with IPP server 19 to receive the print data. It should be noted that the print data travels over all three of IPP, HTTP, and TCP/IP protocols between respective ones of IPP clients 17 and IPP server 19.

Although FIG. 2 is illustrated with an IPP client/server communication between client modules 14 and CHE 6, other communication protocols, or layers of protocols, may also be used. For example, to facilitate printing that is secure, an SSL (secure socket layer) protocol may be utilized. In such an arrangement, a protocol stack is used, consisting of IPP client 17 over HTTP over SSL over TCP/IP. A complementary arrangement is provided at CHE 6. Similarly, other protocols may be used, and multiple protocols can be used in parallel or in stacked arrangements.

Whatever client/server arrangement is used, the client and servers communicate over a CPSI transport layer that facilitates communication from CPSI client 16. In general, data is pushed in one direction from CPSI client, with little or no data (other than acknowledgements and the like) returning in the other direction toward CPSI client 16. The actual CPSI transport may use TCP/IP, SMTP, or the like. The sessions may be secure. The CPSI transport layer is configured to hide any differences in the actual transport from CPSI client 16, so that the actual transport it transparent from the viewpoint of CPSI client 16, thereby making CPSI client 16 transport-independent.

CHE 6 includes CPSI server 37, which is complementary in software structure to CPSI client 16, and acts to receive data transmitted from CPSI client 16. CHE 6 further includes spooler 20, which assigns print data received from IPP server 19 and CPSI server 37 to a logical printer corresponding logically to a printer 12, and queues print data for a physical device corresponding to the logical printer. CPSI spooler 20 assigns print data to a logical printer by retrieving a profile from preferences directory 21 which corresponds to a user ID or other address information received with the print data.

Besides address information, preference directory 21 also stores other information relating to subscriber preferences. Such information is set initially by the subscriber, during a registration process, and may thereafter be modified as desired. One such preference is a blocking feature, whereby a subscriber can block printing jobs that are received from particular merchants, or can accept print jobs only if they are received from particular merchants. Another such preference involves selection and configuration of an automatic data/information delivery service. According to this delivery service, and based on subscriber preferences, CHE 6 periodically executes a data gathering application (like application 22) that gathers information from internet sources (such as news, coupons, theater schedules and the like), packages the information into a print job, and sends the print job to the subscriber's set top box.

CPSI spooler 20 is also connected to cable-specific applications such as application 22 through CPSI server 37, IPP server 19, IPP client 18, and CPSI client 23. CPSI client 23 is similar to CPSI client 16. Moreover, application 22 is similar to client application 15, in that it provides an application executed to perform services specific to a client (here, the cable head end) and can deliver print data to CPSI spooler 20.

IPP client 24 is connected to CPSI spooler 20 via CPSI client 38 to allow CHE 6 to communicate with each STB 10. CPSI client 38 is similar to CPSI clients 16 and 23, and again provides for a complementary software architecture and data communications with a CPSI server at the set top box. In this regard, only two of many thousands of STB's are illustrated. Each STB 10 includes IPP server 25 for connection to IPP client 24. It should be noted that, to deliver data from CHE 6 to STB 10, a server is established in STB 10 and a corresponding client is established in CHE 6. In such a case, a preferred transport protocol is again the CPSI transport layer, which is usable regardless of the particular underlying transport (TCP/IP, SMTP, QPSK, DOCSYS, broadband through IP gateway, etc.).

Although FIG. 2 illustrates an IPP client/server communication between CHE 6 and STB 10, other protocols may also be used. For example, in a situation where the resources available in STB 10 are already strained, it is possible to use SMTP and POP mail protocols to deliver print jobs from CHE 6 to STB 10. Advantages of such an arrangement include the fact that many conventional STB's already include mail protocols, thereby avoiding a further increase in STB resource usage, firewalls that might exist in CHE 6 will allow mail to go through, multiple mailboxes can be defined in each household, and mail clients (at the client modules) can easily be configured to support print jobs. In the latter situation, CHE 6 and corresponding client modules 14 are also configured for communication via a mail protocol client/server relation, such as an SMTP client/server. Similarly, other protocols can be used between CHE 6 and respective STE 10's, and multiple protocols can be used in parallel or in stacked arrangements.

STE 10 includes CPSI server 39, and further includes CPSI spooler 26, which controls a single queue for a single logical printer corresponding to printer 12. Otherwise, CPSI spooler 26 is nearly identical to CPSI spooler 20, as are CPSI server 39 and CPSI server 37. The limited functionalities of CPSI spooler 26 and CPSI server 39 are advantageous because STE 10 is likely to have limited computing resources. STE 10 also includes STB client application 27, which communicates to CPSI spooler 26 through CPSI client 29, using a subset of the API used by client application 15. This configuration allows an STE user to initiate local print jobs.

Figure 3:
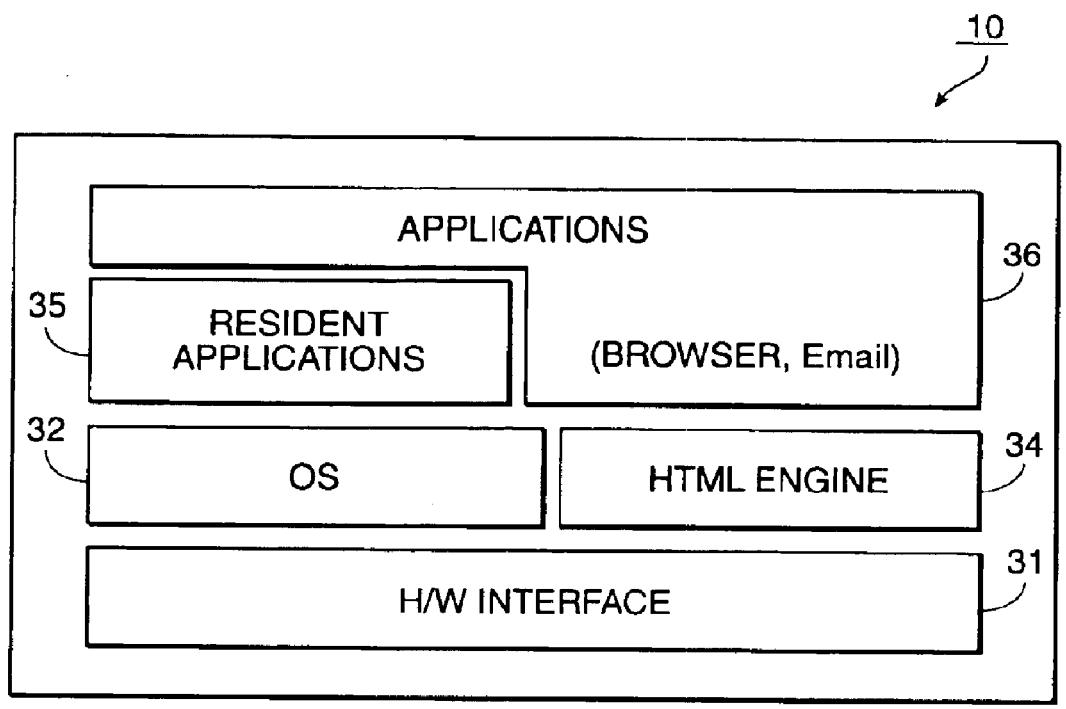
FIG. 3 illustrates representative software architecture of a set top box.

FIG. 3 illustrates representative software architecture of set top box 10. In general, this software architecture, together with the hardware architecture of the set top box, supports the reception of analog and digital services. In the case of analog services, STE 10 tunes to an analog channel, extracts the NTSC video signal, and drives the local television receiver. In the case of digital services, STE 10 tunes to the appropriate digital channel, extracts MPEG-2 video packets, decrypts, decompresses and routes the resulting video to an NTSC driver, so as to obtain an NTSC signal to drive the local television receiver. In addition, private data is received over the digital channel. Print jobs can be delivered to STB 10 over a digital channel of digital services, or over private data channel, and is delivered using the CPSI transport. STB 10 reconstructs the packets from the CPSI transport, and routes the data to the addressee, here, IPP server 25.

Through the software architecture illustrated in FIG. 3, STB 10 hosts various applications that present to the home user functionality offered by various cable services. Typical applications are a navigator, an interactive program guide, electronic mail and a web browser. Most of these applications are client/server implementations, where STB 10 hosts the client software, and CHE 6 hosts the server software. Communication between client and server over the cable network is facilitated by an operating system executed on STB 10, and is performed through published API's. Depending on the hardware platform and the operating system, those applications may be resident at STB 10, or can be downloaded from servers situated at CHE 6 for execution at STB 10.

Thus, as shown in FIG. 3, software architecture and STB 10 includes an interface 31 to hardware, an operating system 32, an HTML engine 34, resident applications 35, and other applications 36. The operating system 32 is usually vendor-specific for the STB, and may include operating systems such as PTV, WinCE, MicroWare or OpenTV. HTML engine 34 provides a group of independent handlers that can be plugged together in conformity to known plug-in specifications so as to provide ability to handle different types of media such as HTML, GIF, MPEG, HTTP, Java script, etc. The HTML engine 34 is used to allow STB 10 to render HTML documents to a windows manager for display on the local television receiver. HTML documents may be retrieved from local cache, from in-band and out-of-band broadcast carrousels, VBI streams, HTTP proxy servers located at CHE 6, or remote HTTP servers accessed by the STB user over the internet. In the latter case, documents retrieved from external web servers are filtered by a proxy according to predefined filtering criteria (such as surf watch), which also may convert requested documents into formats supported by the HTML engine 34.

Resident applications 35 include such applications as the aforementioned navigator, interactive program guide, and the like.

Applications 35 and 36 include a web browser, an e-mail program, a print driver for attached printer 12, and the like. Of particular note, these applications include the aforementioned applications from FIG. 2, namely IPP server 25, CPSI spooler 26, CPSI client 29, and STB client applications 27.

[Rasterization]

Because of limited resources available within STB 10, print data destined for printer 12 is not forwarded to STB 10 in a high level device-independent print language (such as a page description language like PCL5, PDF, PostScript or the like) for rasterization at STB 10. Such an arrangement, which requires STB 10 to rasterize print data based on a higher level printer language would often overwhelm the availability of resources at STB 10. Accordingly, and because a high speed data communication link exists between CHE 6 and STB 10, rasterization is performed at CHE 6, and rasterized data is sent from CHE 6 to STB 10 for printout by printer 12. This section describes a preferred implementation for achieving this effect.

Figure 4:
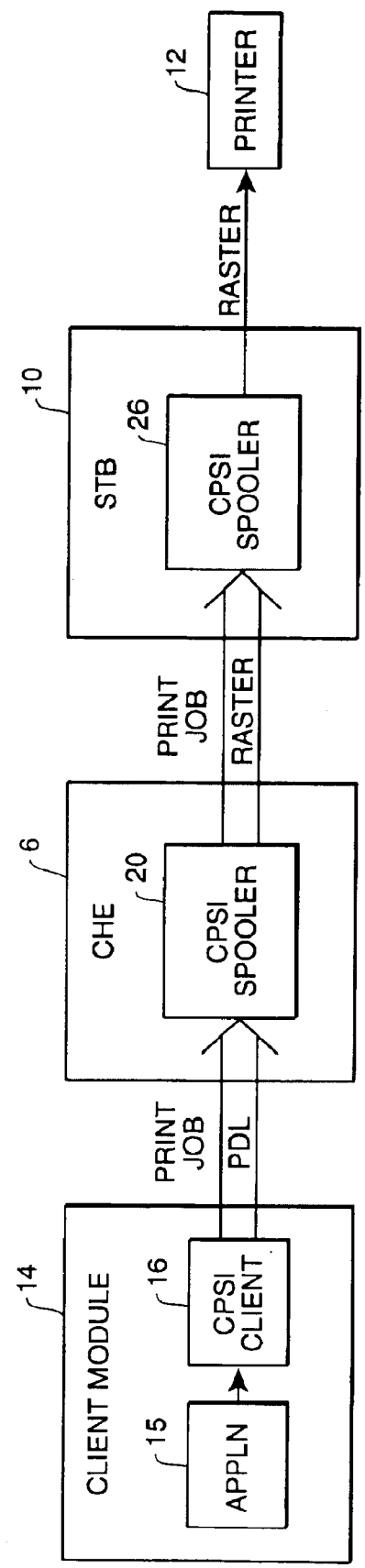
FIG. 4 shows the overall data flow of a print job from a client module through to its final delivery to a printer.

FIG. 4 shows the overall data flow of a print job from client module 14 such as a remote merchant or a client application executing at CHE 6, through to its final delivery to printer 12 at the home of the STB user. As shown in FIG. 4, client application 15 executing in client module 14 generates a print job addressed to one or more printers at one or more STBs. The print job is generated in a high level page description language (PDL) such as PostScript, PDF, HTML, or the like. High level printer languages such as these PDLs are preferred, since they are printer independent, thereby freeing the client application from a need for any knowledge of the configuration of the destination printer 12. The print job in PDL format is delivered over the aforementioned CPSI client 16 from the client module 14 out through to CHE 6 where it is eventually accepted by CPSI spooler 20. At CPSI spooler 20, the print job is rasterized based on knowledge of the configuration and type of destination printer 12, which in turn-is obtained by CPSI spooler from preferences directory 21 based on the destination printer address provided by the client module. The rasterized print job is delivered over the aforementioned client/server relationship between CHE 6 and STB 10, where the rasterized print job is eventually accepted by CPSI spooler 26 at STB 10. From there, the rasterized print job is delivered to target printer 12 for printout thereby.

Figure 5:
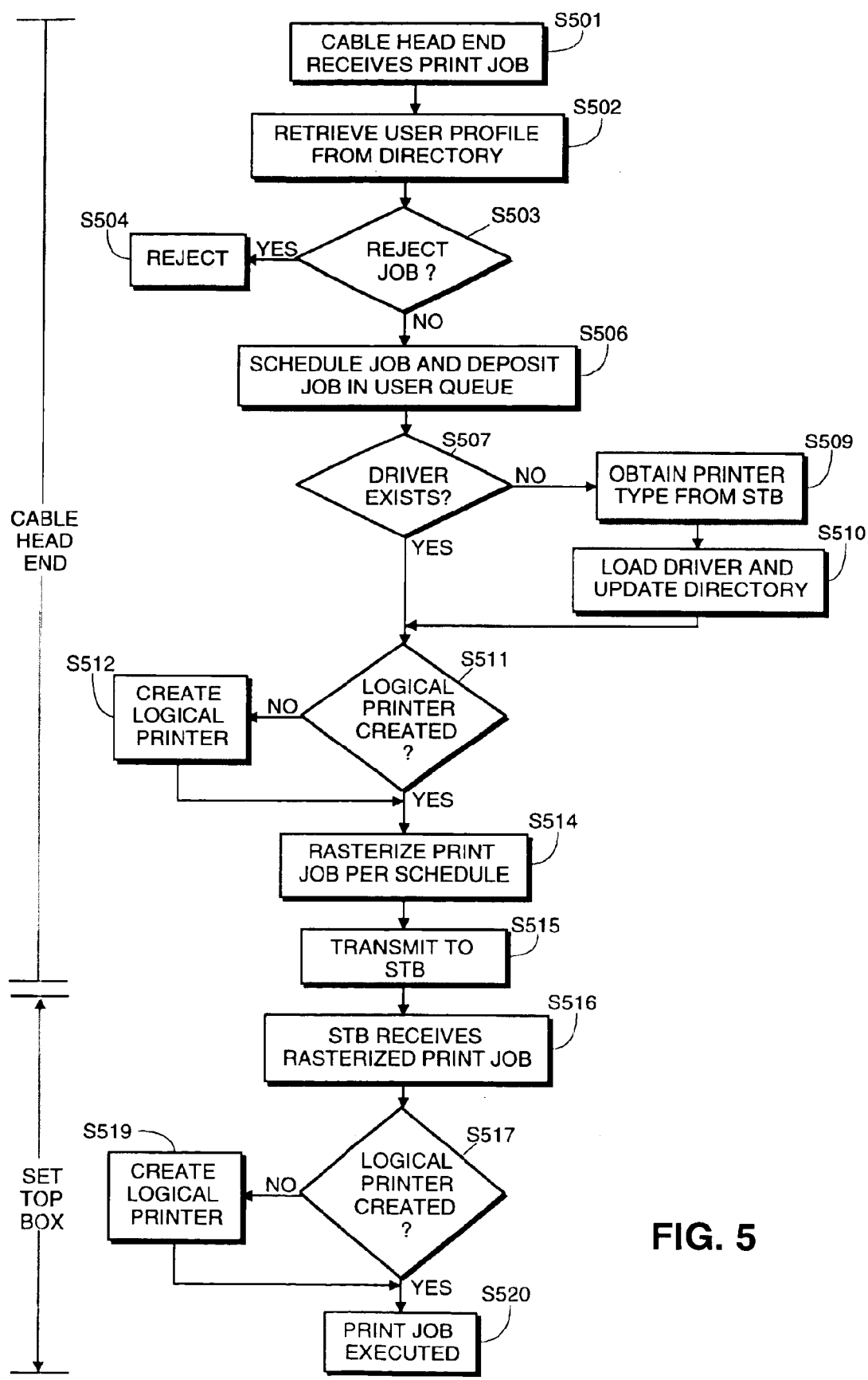
FIG. 5 is a flow chart for describing the overall data flow of a print job from a client module through to its final delivery to a printer.

FIG. 5 is a flow chart which illustrates this process in further detail. The process steps shown in FIG. 5 are stored on a computer readable medium such as an unshown memory at CHE 6 (for those steps performed by cable head end 6) or an unshown memory at STB 10 (for those process steps executed by set top box 10). Briefly, according to the process steps shown in FIG. 5, to print a print job received by a cable head end on a printer connected to a set top box that communicates with the cable head end over a high speed data communication network, the print job is received by the cable head end in a high level printer description language addressed to one or more such printers. Based on the address, the cable head end obtains a software driver for the printer, the software driver corresponding to configuration and type of the addressed printer. A logical printer is created in the cable head end (if a logical printer does not already exist), the logical printer corresponding to the software driver, and the logical printer is executed so as to rasterize the high level printer description language print job into a rasterized bit map image format. The rasterized bit map image format is transmitted over the high speed data communication network to the set top box addressed in the print job. At the set top box, the set top box creates a logical printer corresponding to its locally connected printer (if a logical printer does not already exist), with the logical printer accepting as its input the rasterized bit map image data. The rasterized bit map image data is sent to the set top box's logical printer, which in turn routes the print job to the locally connected printer.

In more detail, FIG. 5 shows steps S501 through S515 that are performed at CHE 6, and steps S516 through S520 that are performed at STB 10. In step S501, cable head end 6 receives a print job from a client application. The print job is preferably in a high level printer description language (PDL) which is printer independent. In addition, the print job includes one or more addresses identifying the destination or destinations for the print job. The addresses may be in any convenient format agreed to mutually between cable head end 6 and the client applications.

It is envisioned that the print jobs received by cable head end 6 are print jobs from merchants located remotely and connected to cable head end 6 via the internet. Examples of merchants and corresponding print jobs include a bank that prints out bank statements directly into a customer's home, utility companies that print out utility bills directly at a consumer's home, advertisers that printout advertisements and/or coupons directly at a consumer's home, newsletter/news clipping services that print out periodicals directly in a reader's home, and the like. It is also possible for the print job to be delivered from a client application executing at cable head end 6, for example, a client application 22 that generates a monthly cable guide for printout in a viewer's home, a news retrieval service which, based on automatic searches performed in accordance with user preferences over the internet, obtains news from a variety of internet sources, collates such news, and prints news out directly in a news reader's home, and the like. Multiple other arrangements are easily envisioned. What is preferable in the context of the invention, however, is that the print job is received by CPSI spooler 20 in cable head end 6 in a printer-independent format such as the aforementioned printer description languages.

In step S502, and based on the printer addresses received with the print job, CHE 6 accesses preferences directory 21 so as to retrieve user profiles for the users corresponding to the printers to which the print job is ultimately destined. User profiles preferably include at least an identification of printer configuration and type of printer 12 connected to the user's set top box. Other information may also be included in the user preference. One such piece of information is a blocking filter, which specifies filtering applied to the print jobs, thereby to permit a user to exclude unwanted print jobs. For example, so as to avoid a proliferation of unwanted print jobs at his home printer, a user may specify preferences instructing cable head end 6 to block print jobs from specific sources, or to allow print jobs only from specific sources. Any such preferences are applied in step S503 in which CHE 6 determines whether or not to reject the print job. If the job is rejected, flow branches to step S504 so as to reject the job and, possibly, to inform client module 14 that the job has been rejected.

If the print job is accepted for printout, flow advances to step S506 in which the print job is scheduled and deposited in the subscriber's queue, and the step S507 in which the cable head end determines whether a print driver exists for the printer to which the print job is destined. A print driver might not exist for a variety of reasons. One such reason is that the cable head end does not have available a software module corresponding to the printer defined in the user profile. In such a circumstance, cable head end 6 simply accesses an internet provider of such a software driver, such as an internet site corresponding to the printer manufacturer. One more common situation in which a driver might not exist, however, is a situation in which the user profile does not contain any identification of printer configuration or type. Such a situation is addressed in steps S509 and S510, to which CHE 6 branches in a situation where a driver does not exist for failure of the user profile to specify a printer.

Thus, in step S509, CHE 6 communicates directly (via CPSI spooler 20, CPSI client 38, and IPP client/server 24 and 25) to the destination STB 10, with a request for STB 10 to provide an identification of configuration and type for printer 12 connected to STB 10. STB 10 responds with the needed information, which is obtained by CHE 6. In step S510, CHE 6 loads the driver corresponding to the identification information provided from STB 10, and in addition updates the user profile in preferences directory 21, so that future print jobs can be performed more readily, without the need for communication with STB 10 for the purpose of determining printer identification.

In any event, once a driver exists, flow advances to steps S511 and S512, in which CPSI spooler 20 in CHE 6 determines whether a logical printer corresponding to the print driver already exists, or if one needs to be created. A logical printer will already exist if a prior print job has already been processed. Using the logical printer, CPSI spooler feeds the print job in the printer-independent PDL format to the logical printer, such that the logical printer rasterizes the print job into a printer-specific rasterized bit map image (step S514). It should be understood that the rasterized bit map image print job is not simply a fully bit map raster of the print job. Rather, the rasterized bit map print job is a bit-by-bit representation of the print job tailored specifically for the printer corresponding to the logical printer in CPSI spooler 20. As one example of printer-specific rasterization, many printers require print commands embedded in the print job, so as to enable control over the printer. Examples of such print commands include start-of-page, advance-down, eject-page, load-new-page, and the like. Such printer-specific commands are embedded in the rasterized print job. As a further example, some printers, such a bubble jet printers, print in bands, and embedded commands are needed so as to define such bands. As yet a further example, some bubble jet printers that print in color require print data to be supplied out of sequence for each different color, so as to accommodate physical differences in location between printing jets for one color relative to printing jets for another color. Whatever the source of printer specificity, the rasterized bit map print job created by the logical printer in step S514 is printer-specific, tailored directly based on the identity of printer configuration and type of printer 12.

Step S515 transmits the rasterized bit map print job to STB 10. As described above, the transmission to STB 10 is from CPSI spooler 20, via CPSI client 38, IPP client/server 24 and 25, to CPSI server 39 and spooler 26 in STB 10.

At the set top box, step S516 receives the rasterized bit map print job in CPSI server 39 and forwards it to CPSI spooler 26. If a logical printer does not already exist in CPSI spooler 26, then a logical printer is created based on the identity of printer type and configuration for attached printer 12 (steps S517 and S519). In step S520, CPSI spooler, using the logical printer, executes the rasterized bit map print job so as to send the print job to printer 12 where it is rendered into a visible printed image.

[Push Printing]

As described previously, the purpose of the CPSI architecture is to offer facilities that will enable applications running anywhere on the internet to print on printers attached to set top boxes. Such printing is referred to as "push printing" in the sense that the remote applications push print data through the cable head end to the set top box for printout at an attached printer.

Of course, it is possible to provide the set top box with its own printing capability, so as to enable a user to print data as desired. Such printing is referred to as "pull printing", in the sense that the user of the set top box pulls data for printout from sources remote from him. For example, a user may, as part of browsing the internet, come across a web page of interest, and may request printout of such a web page. Such printout is "pull printing" and is different from "push printing" described hereafter.

General printing goals of the architecture described above and hereinafter include the ability to support attachment and software and driving of any supported printer, as well as the-elimination of any need for a user to intervene in installation of a printer beyond physical connection to the set top box. Because of a uniform API, software maintenance costs are reduced. In addition, by virtue of the CPSI software architecture, printing does not interfere with other programs running on the set top box, such as web browsing applications or television viewing. In addition, the CPSI architecture is portable across a variety of platforms, and supports a variety of different operating systems, particularly those operating systems that maintain execution in the set top box itself.

Push printing in particular represents a model in which print action is initiated by an entity other than the set top box user. It is assumed that this entity, which actually may either be local to the cable head end or be an internet citizen, owns the document for which the print job is desired, or is able to reference it. Two different printing modes are contemplated:

1. Unicasting, which refers to a point-to-point connection in which a remote internet site sends print data separately to each destination client; and 2. Multicasting, which refers to a mode in which a single copy of the print data is sent to multiple destination points. Multicasting can also include broadcasting, in which a single copy of print data is sent to all destination points rather than to a selected subcast thereof.

Examples of print jobs subject to push printing include merchant-initiated print jobs from remote internet sites.

Such merchant-initiated print jobs may include constant content print jobs, such as a flyer advertising particular items for sale. The flyer can be printed in a unicast or multicast mode, and is delivered in the appropriate unicast or multicast mode from the cable head end to the appropriate set top boxes. Merchant initiated print jobs can also include variable content print jobs such as personalized statements like retailing, a bank statement or a utility bill. Based on a client application running at the merchant's server, the print job is created, and submitted to the cable head end. Again, the cable head end delivers the print job in either unicast or multicast mode, as requested by the print job to the set top box or boxes in question.

Generalized goals of merchant initiated printout from remote internet sites include the following. First, the merchant is able to submit the print job at its own internet site, by means of a client application running on the merchant's CPU. The merchant is able to specify parameters for the print job, including destination address and whether or not the transmission is via secured or unsecured transmission. The destination address may specify unicast or multicast printing, meaning that the destination address might identify only a single recipient, or might represent multiple recipients or a group of recipients. The print job is generated in non-proprietary device independent format, by use of widely available client applications, or even customized print applications, that print through standardized and device independent format. This is achieved through separation of the print submission client and the content creation tool: the content creation tool is left to the merchant, whereas the print submission client is embodied in the CPSI client described above. At the cable head end, resident software maintains a directory of user profiles in preferences directory 21, the profiles including subscriber name, subscriber account number, address, printer model, set top box capabilities, any blocking filters, and policy data. The CPSI spooler at the cable head end discards print jobs that meet criteria specified by blocking filter data, or accepts only print jobs that meet other specified criteria. A system administrator at the cable head end is able to display a print queue, indicating global print jobs for all cable subscribers, or print jobs on a per user basis. Using such a print queue, the system administrator is able to examine the status of jobs in the queue, and the status of corresponding printers attached to set top boxes, and is further able to delete jobs in the queue and override any of user selectable print options. The cable head end spooler does not commence a print job until it has ascertained that the set top box is ready to accept print data, and that the attached printer is ready and on line. Preferably, the CPSI spooler in the set top box is able to commence a print operation before the entire print job has been downloaded from the cable head end, and is further able to confirm successful completion of print jobs.

Figure 6A:
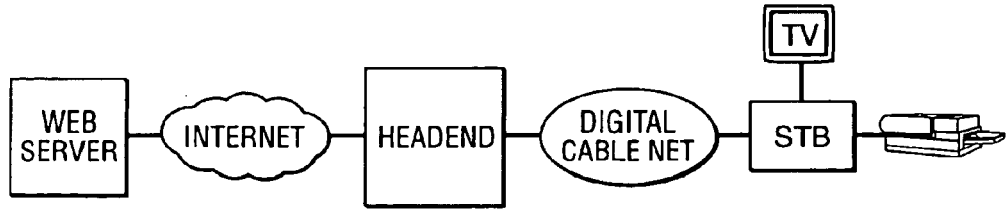
FIGS. 6A, 6B and 6C illustrate general arrangements for unicast (point-to-point) printing and multicast (one-to-many) printing.
Figure 6B:
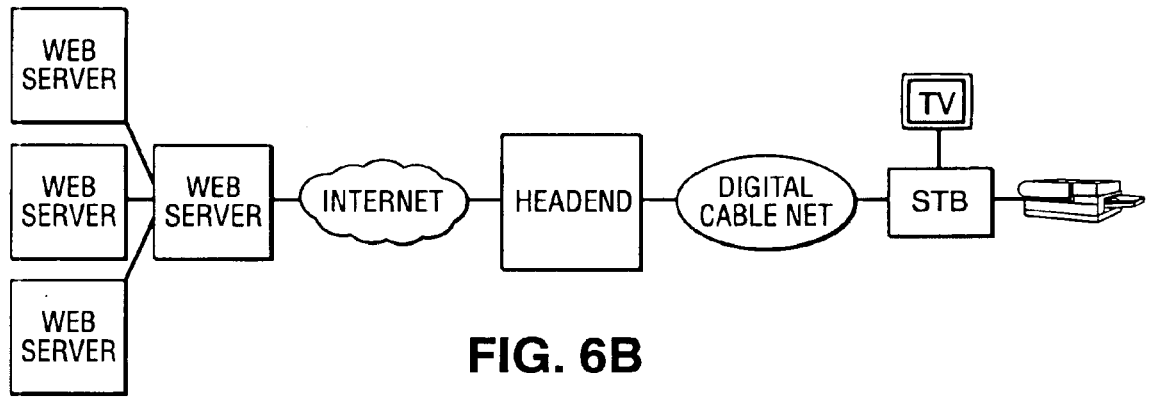
Figure 6C:
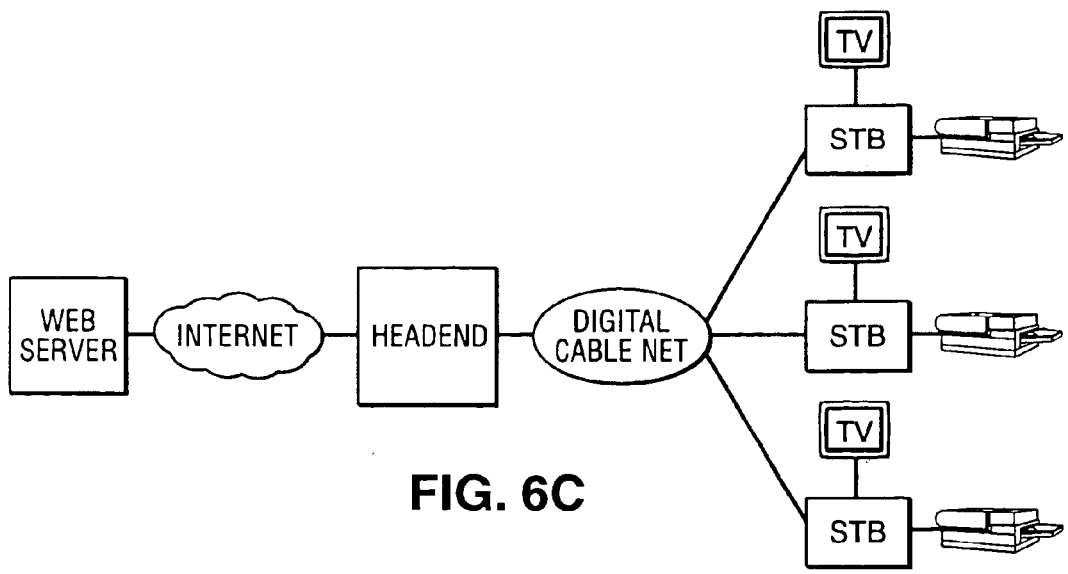

FIGS. 6A, 6B and 6C illustrate general arrangements for unicast (point-to-point) printing and multicast (one-to-many) printing. As shown in FIG. 6A, unicast printing involves printout of a print job from a remote web server to a specifically identified printer attached to a set top box. The print job is routed via the internet to the cable head end, and thence over the digital cable network to the set top box for printout at the destination printer. FIG. 6B illustrates an alternative form of unicast printing, in which a remote web server gathers data from multiple different web sites, aggregates the data into a single print job, and then push-prints the resulting print job to a destination printer. Of course, although the aggregating server is illustrated as a remote web server, it is possible for an aggregation application to execute within the cable head end, communicate over the internet to multiple different web sites for collection of aggregate data, to aggregate the data at the cable head end, and then to push-print the aggregated print job to a destination set top box.

FIG. 6C shows multicast printing in which a remote web server generates a print job having multiple destination printers. The print job is routed to the cable head end via the internet, which thereupon routes the print job, in a multicast or broadcast configuration, over the digital cable network to multiple different set top boxes for printout by respective printers attached thereto.

Figure 7A:
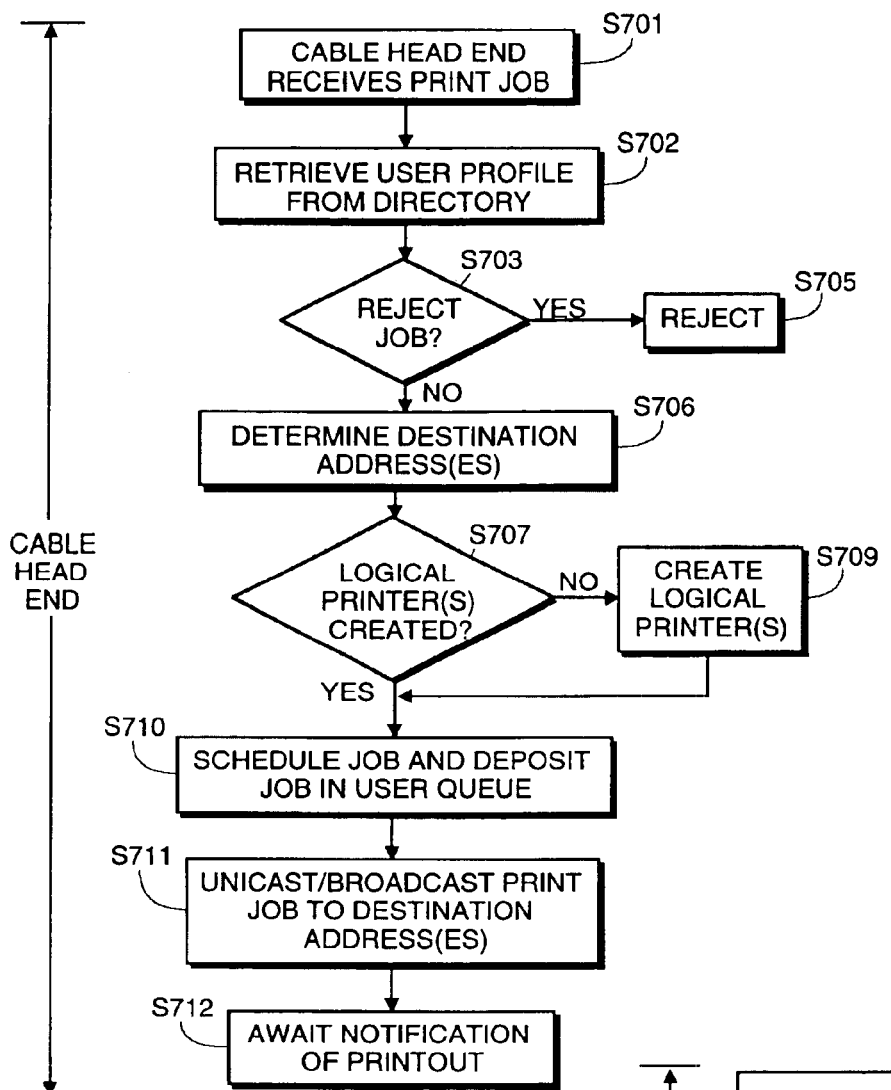
FIGS. 7A and 7B are flow charts showing respective processing by the cable head end and by the set top box in response to a print job.
Figure 7B:
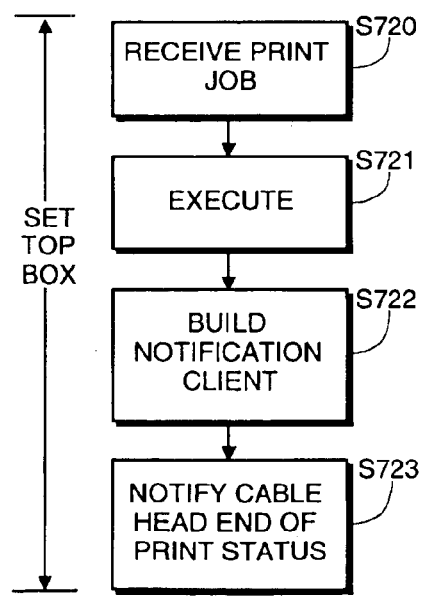

FIGS. 7A and 7B are flow charts showing respective processing by the cable head end and by the set top box in response to a print job. Referring first to FIG. 7A, step S701 illustrates receipt by the cable head end of a print job from a remote internet source, or from an application such as 22 at the cable head end. In step S702, the cable head end retrieves the user profile from directory 21 (FIG. 2). Based on the user profile, cable head end determines (in step S703) whether or not to accept or to reject the job. If the job is rejected, flow advances to step S705 and the job is not processed further. It is possible for step S705 to send information back to the upstream remote internet site, indicating that the job has been rejected.

On the other hand, if the job has not been rejected, flow advances to step S706, in which, based on destination information included with the print job, the cable head end determines the destination address or addresses for the print job. Steps S707 and S709 create logical printers if they are needed. That is, if a corresponding logical printer or printers do not already exist in spooler 20, the needed logical printer or printers are created in CPSI spooler 20 (FIG. 2), with a separate logical printer being created for each different printer needed to accomplish the unicast or multicast printing. That is, in a unicast mode, since only a single printer is involved, then only a single logical printer corresponding to the printer in question is created. On the other hand, in a multicast or broadcast mode, multiple users and multiple printers are the destination for the print job. It is possible, however, for several of the multiple users to employ the exact same printer and printer configuration. As a consequence, although it is likely that multiple logical printers are created in the CPSI spooler at the cable head end, it is equally likely that a single logical printer will be able to support several users because each of the several users will have exactly the same printer type and configuration.

The print job is thereafter scheduled and deposited into the user's queue (step S710), for rendering by the logical printers (or spooled for subsequent rendering just prior to delivery to the STB). It is possible to render the print jobs into a bit map rasterized format, as discussed above in connection with FIG. 5, but this is not ordinarily necessary. Rather, all that is necessary is for the logical printers to process the print job for subsequent use by the set top boxes.

In step S711, the print job from each logical printer is unicast or broadcast to the destination address or addresses. Thereafter, in step S712, the cable head end builds a notification server so as to await notification of printout from each of the set top boxes to which print data has been transmitted.

FIG. 7B illustrates process steps performed by the set top box in response to receipt of a print job transmitted from the cable head end over the digital cable network. Thus, in response to receipt of a print job (step S720), the set top box executes the print job (step S721) so as to print the print job on its attached printer. It is possible for the set top box to utilize the CPSI spooler arrangement discussed above in connection with FIG. 5, but this is not mandatory. Rather, according to this aspect of the invention, it is only necessary for the set top box to receive the print job and to cause its attached printer to print it.

In step S722, the set top box builds a notification client for communication with the corresponding confirmation server built at the cable head end in connection with step S712. The notification client in the set top box then communicates with the notification server at the cable head end (step S723) so as to notify the cable head end of ongoing print status. In particular, the notification client at the set top box notifies the cable head end as each sheet of the print job is commenced, as each sheet is concluded, and as the print job is concluded. In addition, the notification client permits interaction from the user at the set top box, whereby the user at the set top box can modify his print queue by cancelling jobs or advancing jobs out of sequence from the queue.

At the cable head end, and based on information received from the notification client at the set top box, the cable head end can distribute print status information as appropriate. For example, it is possible for the cable head end to transmit print status back to the originating merchant at the remote internet site, so as to permit the merchant to confirm that the print job has been successfully completed. Alternatively, or in addition, it is possible for the cable head end to utilize the print status information so as to monitor, maintain and manage print queues for each and every one of the set top boxes connected to the digital cable network.

Figure 8:
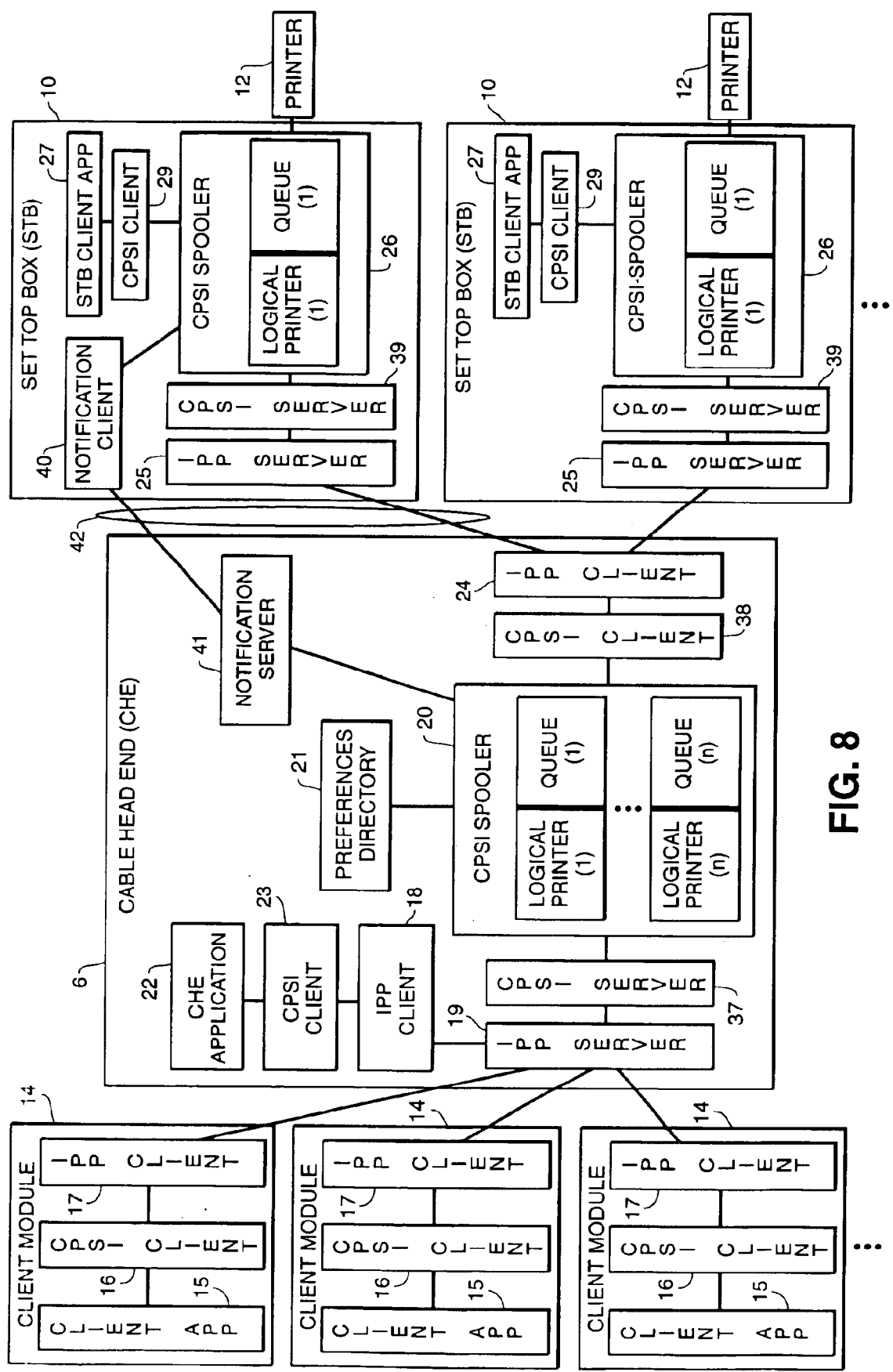
FIG. 8 illustrates the relationship of the confirmation client created in the set top box and the confirmation server created in the cable head end.

FIG. 8 illustrates the relationship of the notification client created in the set top box and the notification server created in the cable head end. In FIG. 8, the same reference numerals as those used in FIG. 2 are utilized whenever the functions are the same. What is shown further in FIG. 8 is notification client 40 created by set top box 10, for monitor of the status of the print job being spooled to printer 12 by CPSI spooler 26. Notification client 40 transmits printer status information back to notification server 41 in CHE 6 for use by CPSI spooler 20 to monitor and manage print queues, and to provide notification information of successful printout back to client modules 14. Notification client 40 and notification server 41 communicate over the digital cable network 42, using the same physical wire as that used by IPP client and server 24 and 25.

By virtue of the foregoing arrangement, push printing from remote internet sites is facilitated at printers connected to set top boxes that are fed data from a cable head end and via a digital cable network. The push printing can be unicast or multicast. In addition, notification of print status is provided from the set top box back to the cable head end, thereby permitting confirmation of printout to the remote internet merchant, or maintenance and management of print queues from the cable head end.

[Secure Printing]

The ability of the present invention to provide push-printing as discussed immediately above, allows a merchant having internet client application 15 to send print data through CHE 6 to a subscriber at the subscriber's STB 10. For instance, a merchant having an internet application, such as a bank or credit card services company, generates print data which corresponds to a particular subscriber, such as a banking statement or a credit card statement, for automatic printing on the printer which is locally attached to the set top box of the subscriber. It can be appreciated that such print data is of a confidential nature and that it would be preferable to have the print data sent to STB 10 in a secure manner.

As such, the present invention provides the ability to allow client application 15 to push-print confidential print data to a subscriber at STB 10 via CHE 6 in a secure manner.

Figure 9:
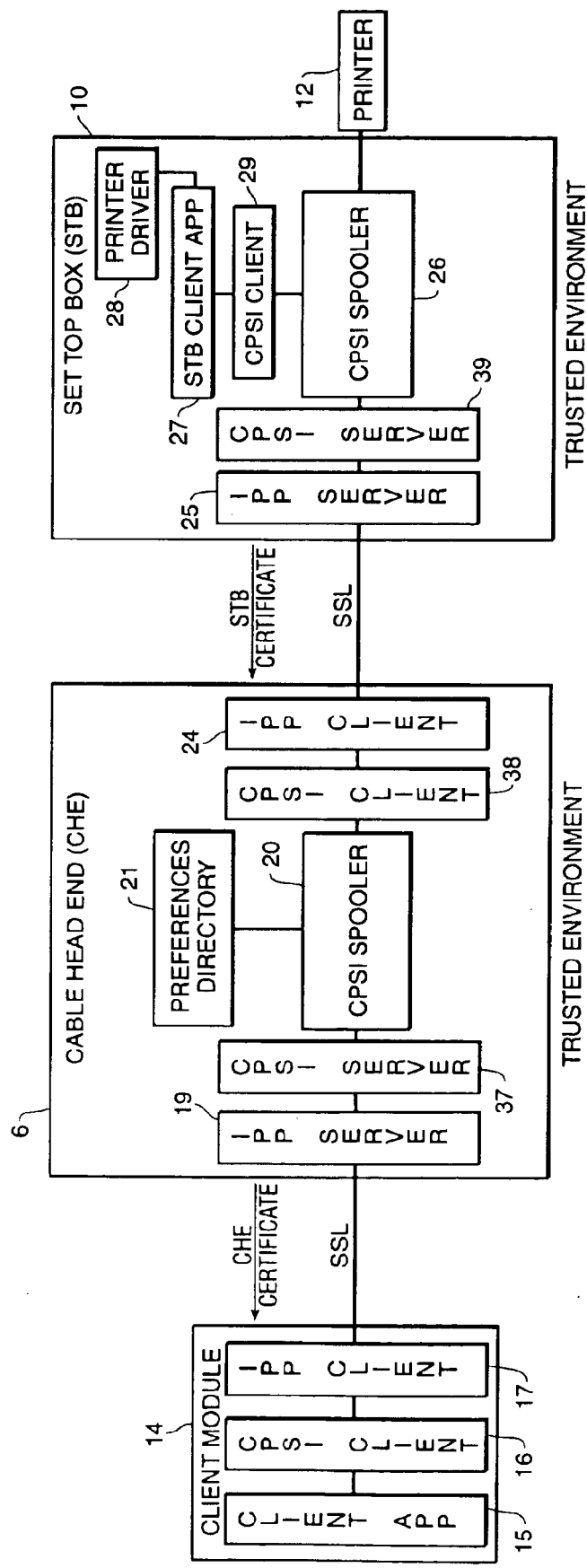
FIG. 9 is a block diagram illustrating secure printing of print data.

FIG. 9 illustrates a first embodiment for is secure printing of print data from client application 15 in client module 14 to STB 10 via CHE 6 for printing on printer 12. In this embodiment of in secure push-printing, both CHE 6 and STB 10 are considered to be trusted environments. A trusted environment is one which can be trusted to receive data and to access and/or maintain the data in a trusted manner so as to prevent misuse of the data or transfer of the data to non-trusted environments.

First, as illustrated in FIG. 9, secure printing is achieved by establishing a secure connection between client application 15 and CHE 6, and between CHE 6 and set top box 10. Specifically, the preferred embodiment utilizes a secure protocol between CPSI client 16 and CPSI server 37 to establish a secure connection between client application 15 and CHE 6. A secure protocol, such as secure sockets layer (SSL) protocol, is used in addition to the previously described protocols between client application 15 and CHE 6 in order to achieve secure push-printing. FIG. 10 depicts the protocol layers that are preferably utilized between client application 15 and cable head end for secure push-printing. The protocol layers, often referred to as a protocol stack, are described in FIG. 10 from the perspective of a communication path between CPSI client 16 and CPSI server 37. Specifically, it can be seen from FIG. 10 that CPSI protocol 1001 is the top layer communication protocol between CPSI client 16 and CPSI server 37. Directly below CPSI protocol 1001 is IPP protocol layer 1002 which provides the printing specific protocol for communication between IPP client 17 and IPP server 19, which are in direct communication with CPSI client 16 and CPSI server 37, respectively. HTTP protocol 1003 may also be utilized for communication between client application 15 and CHE 6 and is located directly below IPP protocol layer 1002. SSL protocol layer 1004 resides directly below HTTP protocol layer 1003 so as to provide for a secure communication path between CPSI client 16 and CPSI server 37. Directly below SSL protocol layer 1004 is the underlying transport layer 1005 which may be comprised of TCP/IP, or other such transport protocols. In this manner, secure transport of print data from client application 15 to CHE 6 is made possible. The present invention-is not limited to the use of SSL, and any other secure protocol or secure transport mechanism may be utilized to accomplish the same result.

Returning to FIG. 9, the secure connection between client application 15 and CHE 6 is established through the use of the above-described protocols, therefore providing a path from client application 15 through CPSI client 16, and IPP client 17 to IPP server 19 and CPSI server 37, respectively. In the preferred embodiment, the connection is established upon the receipt by client application 15 of a certificate from CHE 6 via the SSL protocol 1004. The certificate is preferably signed by a trusted third party and is used to verify that client application 15 is really communicating with CHE 6. In this manner, CHE 6 is authenticated by client application 15. Print data is then sent in a secure manner from client application 15 to CPSI spooler 20 in CHE 6 through the secure connection. It is also possible for client application is provide a signed certificate to CHE 6 so that CHE 6 can authenticate the identity of client application 15. In this manner, client application 15 and CHE 6 are mutually authenticated, thereby ensuring that client application 15 is sending the confidential data to the correct destination and ensuring that CHE 6 verifies the identity of the source of the confidential source. It can be appreciated that such mutual identification is preferable for print data comprising a bank statement or a utility bill.

In the embodiment illustrated in FIG. 9, the print data is provided to CPSI spooler 20 along with the identification information related to the subscriber to whom the print data is to be sent. The print data is provided from client application 15 to CPSI spooler 20 in a device-independent format. CPSI spooler 20 then refers to preferences directory 21 to obtain the necessary information corresponding to the subscriber, such as the print driver information for printer 12 connected to STB 10 corresponding to the subscriber. CPSI spooler then transforms the print data from the device-independent format into a rasterized format by using a printer driver which corresponds to printer 12. The rasterized print data is then spooled by CPSI spooler 20 of CHE 6 for transmission to STB 10.

The print data is then ready to be sent directly to CPSI spooler 26 of STB 10 for immediate printing on printer 12. This is accomplished by establishing a secure connection between CHE 6 and STB 10 in a similar manner to the secure connection between client application 15 and CHE 6 as described above. In the preferred embodiment, CHE 6 receives a certificate from STB 10 so that cable head end can verify the identity of STB 10, whereupon a secure connection is established between CHE 6 and STB 10. As discussed above, mutual authentication can also be implemented so that STB 10 can verify the identity of CHE 6. Once the secure connection is established between CHE 6 and STB 10, CHE 6 sends the rasterized print data to STB 10. CPSI spooler 26 in STB 10 then automatically passes the rasterized print data to printer 12 for printing, thereby providing the confidential data to the subscriber in a secure fashion. It should be noted that although the above description involves confidential print data being sent in a secure manner to only one subscriber, the same method may be utilized for providing confidential information from internet client application 15 to many subscribers, wherein the confidential print data is unique and customized for each single subscriber (unicast). In addition, the above method may also be utilized for secure push-printing of the same print data to many individual subscribers (broadcast/multi-cast).

In addition to the embodiment for secure push-printing as described in FIG. 9, secure push-printing may also be achieved when CHE 6 is not a considered a trusted environment by client application 15. Secure push-printing can still be accomplished according to the embodiment described in FIG. 11. As can be seen by comparison between FIG. 11 and FIG. 9, this embodiment is nearly identical to that of FIG. 9 except that the connection between client application 15 and CHE 6, and the connection between CHE 6 and STB 10 are not necessarily secure and are treated as though they are not secure. Therefore, the print data is transformed from device-independent print data to rasterized print data in the client application 15 prior to being sent to CHE 6 for transmission to STB 10 over the digital cable network. Specifically, client application 15 has access to a printer driver which corresponds to printer 12 which is locally attached to the subscriber's STB 10. Client application 15 therefore renders the print data for printing on printer 12 by transforming it from a device-independent format to rasterized print data specific to printer 12 of the particular subscriber. The rendering of the print data is performed by client application 15 in client module 14 in this embodiment, as opposed to within CHE 6 in the embodiment of FIG. 9, because in this embodiment CHE 6 is not know considered a trusted environment by client application 15 and therefore cannot be trusted to render the print data for printing on printer 12. Preferably, client application 15 also encrypts the print data prior to sending it to CHE 6 for subsequent transmission to STB 10, thereby providing additional security to the print data.

Referring again to FIG. 11, the rasterized, encrypted print data is sent from client application 15 to CHE 6 over the normal connection utilizing CPSI client 16, IPP client 17, IPP server 19 and CPSI client 37, respectively. It should be noted that although a secure connection using SSL is not required in this embodiment, it may be used to provide additional security. CPSI spooler 20 of CHE 6 does not render the data because it is already rasterized but instead simply recognizes the destination information provided in a header section of the encrypted, rasterized data and then spools the rasterized data for transmission to the appropriate subscriber. The encrypted, rasterized data is then sent form CHE 6 to STB 10 via CPSI client 38, IPP client 24, IPP server 25 and IPP server 39 respectively. Similar to the connection between client application 15 and CHE 6, this connection does not need to be secure through the use of the SSL protocol, although it may be secure for additional protection. In this manner, CPSI spooler 26 of STB 10 receives the encrypted, rasterized data from CHE 6. CPSI spooler 26 then decrypts the rasterized print data and then automatically sends the rasterized print data directly to printer 12 for printing, therefore providing the subscriber with the confidential print data in a secure fashion. Unlike the embodiment described in FIG. 9, this is accomplished even though CHE 6 is not a trusted environment by sending the print data from client application 15 to STB 10 in an encrypted, rasterized format, whereby CHE 6 is used as an interim server.

Figure 12:
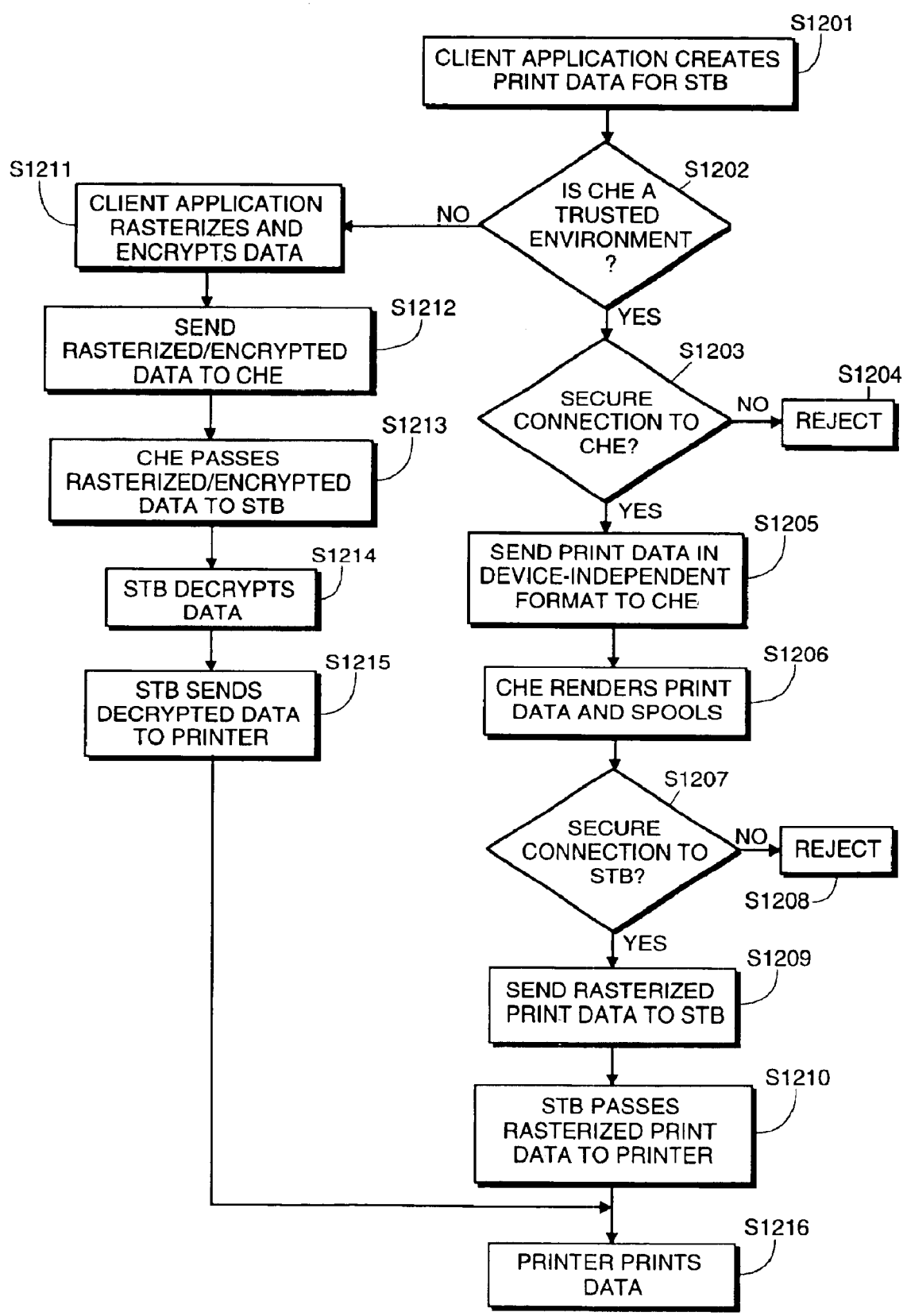
FIG. 12 is a flow chart for describing secure printing.

FIG. 12 provides a flow chart which describes the steps for accomplishing secure push-printing pursuant to the two embodiments described above. In step S1201, client application 15 generated print data related to a specific subscriber, such as a bank statement. Next, it is determined whether or not CHE 6 is considered a trusted environment. (Step S1202). If CHE 6 is a trusted environment, control proceeds to step S1203 in which it is determined if a secure connection can be established between client application 15 and CHE 6, as discussed above. If a secure connection cannot be established between client application 15 and CHE 6, the print job is rejected in step S1204. If a secure connection is established between client application 15 and CHE 6, control proceeds to step S1205 in which client application 15 sends the print data in a device-independent format to CHE 6. CHE 6 then renders the print data in step S1206, as previously described, and spools the print data for transmission to STB 10.

In step S1207, it is determined if a secure connection can be established between CHE 6 and STB 10, as discussed above. If a secure connection cannot be established between CHE 6 and STB 10, the print job is rejected in step S1208. If a secure connection is established between CHE 6 and STB 10, control proceeds to step S1209 in which the rasterized print data is sent from CHE 6 to STB 10. Then, in step S1210, STB 10 automatically passed the rasterized print data to printer 12, upon which printer 12 prints the rasterized print data (step S1216).

Returning to step S1202, if CHE 6 is not considered a trusted environment, control proceeds to step S1211 in which client application 15 rasterizes the print data and also encrypts the print data so that is may be sent to STB 10 via CHE 6 in a secure fashion. Client application 15 sends the encrypted, rasterized print data to CHE 6 in step S1212 with a header that indicates the destination information for the print data and which indicated that the print data has already been rasterized. In step S1213, CHE 6 obtains the destination information that was sent with the encrypted, rasterized print data, spools the encrypted, rasterized, print data for transmission to STB 10, and then transmits the encrypted, rasterized, print data to STB 10. STB 10 then decrypts the encrypted, rasterized print data in step S1214, after which STB 10 sends the decrypted, rasterized print data to printer 12 (step S1215). Printer 12 then prints the rasterized print data in step S1216.

Thus, whether or not cable head end 6 is considered a trusted environment, confidential print data from client application 15 on the internet, such as a bank, can be sent in a secure manner from client application 15 to set top box 10 on a digital cable network through the cable head end 6 for automatic printing on printer 12 that is locally attached to set top box 10. In this manner, a subscriber on a digital cable network can automatically receive monthly billing statements or bank statements from a corresponding internet application maintained by the billing service or bank in a secure manner, thereby preventing misuse or improper access by others of the information contained therein.

[Remote Plug-and-Play]

The configurations described above for the present invention are provided to allow printing from client module 14 to STB 10 via CHE 6, wherein the print data is formatted for printing on printer 12 either at CHE 6 by CPSI spooler 20 or at the client application 15 of client module 14. In those configurations, the print data is generally provided to STB 10 in a rasterized format required for printing directly to printer 12 without the need for utilizing a printer driver in STB 10. The utilization of a printer driver in STB 10 is necessary, however, when a user of STB 10 wishes to print locally, such as when printing a web page that the user is viewing on the television to which STB 10 is attached. A printer driver in STB 10 would also be necessary in instances when print data is provided from CHE 6 to STB 10 in a device-independent format. In such situations, and in others not discussed herein, an appropriate printer driver corresponding to printer 12 needs to be provided for use in STB 10.

Depending on the capabilities of STB 10, a printer driver could be loaded in a variety of ways. For example, if the set top box has sufficient memory capacity, a number of printer drivers could be pre-loaded into the memory of STB 10 for several different printers. In the alternative, STB 10 may allow a floppy disk drive or CDROM, or the like, to be interfaced to STB 10 such that printer drivers could be accessed from a floppy disk or CDROM.

In the set top box environment of the present invention, it is appreciated that a user may prefer to utilize the digital cable network in order to obtain and load a printer driver. Therefore, the present invention provides a manner in which to provide a remote plug-and-play service whereby CHE 6 locates and provides an appropriate printer driver to STB 10 upon request by STB 10, thereby supporting the attachment of a local printer to STB 10.

Figure 13:
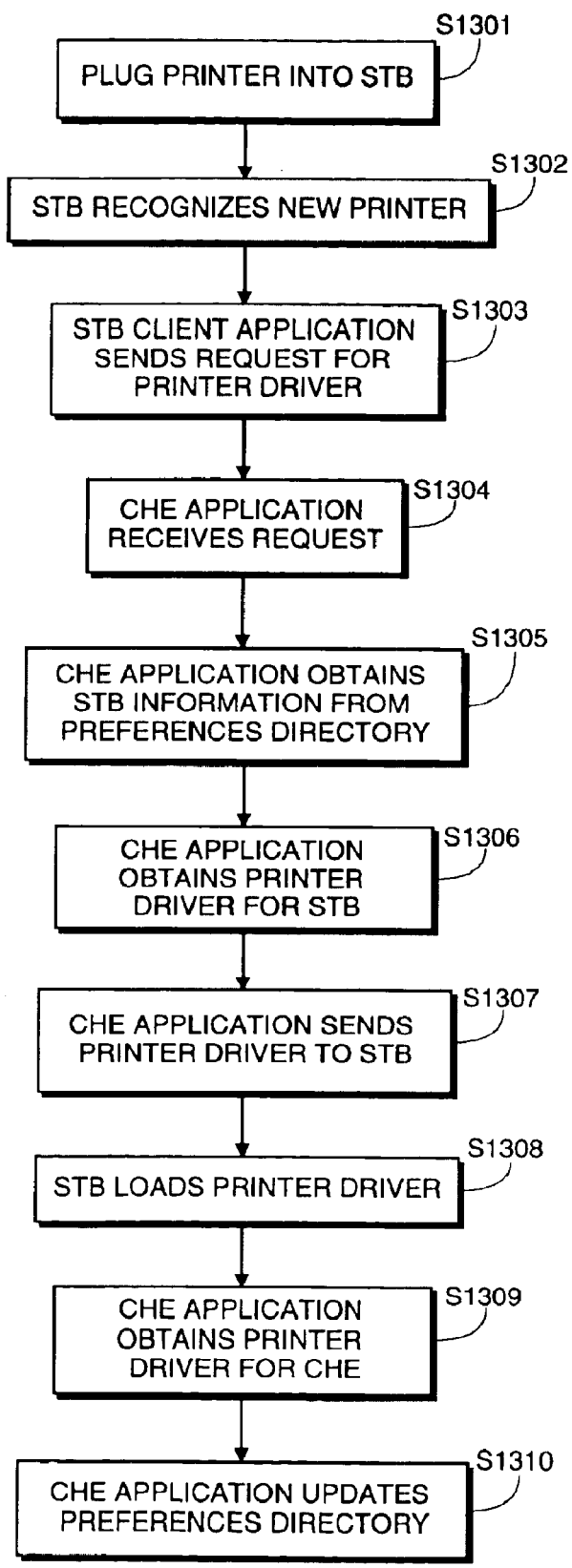
FIG. 13 is a flow chart for describing the remote plug-and-play feature.

This feature of the present invention is described in FIG. 13, which depicts a sequence of steps for accomplishing a preferred embodiment of the remote plug-and-play feature for supporting a local printer attached to STB 10. In step S1301, the subscriber plugs printer 12 into STB 10 via the interface provided by STB 10 for printers. This interface may comprise a universal serial bus (USB), an RS-232 interface, or other printer connection. Next, in step S1302, STB 10 determines that a new printer has been plugged in and that STB does not have a printer driver corresponding to the new printer. This detection is achieved via hardware interface 31 and operating system 32 of STB 10. Client application 27 of STB 10 obtains an indication from operating system 32 that a printer driver is needed for printer 12. STB client application 27 then sends a request to CHE 6 to obtain a printer driver that corresponds to printer 12. The request is sent from STB 10 to CHE 6 via the digital cable network, but not necessarily through the IPP protocol, because print data is not involved in this transaction. Therefore, it can be appreciated that any of the underlying transport protocols such as TCP/IP, may be utilized to send the request from STB client application 27 in STB 10 to CHE application 22 in CHE 6 (step S1303).

It should be noted that the request for printer driver from STB client application 27 preferably includes the information necessary to identify printer 12, such as the manufacturer and model of printer 12. Next, in step S1304, CHE application 22 receives the request for printer driver from STB 10. CHE application 22 then accesses preferences directory 21 to obtain hardware and operating system information which describes STB 10 (step S1305). This information is necessary to determine which type of printer driver should be obtained and sent to STB 10. For instance, the set top box may comprise one of several currently available set top boxes, such as the Explorer 2000 by Scientific Atlanta, the DCT 5000+ by General Instrument, and the Streammaster by Motorola. In addition, the appropriate printer driver must correspond to the operating system implemented in the set top box. For instance, the Explorer 2000 utilizes the Power TV operating system, the DCT 5000+ utilizes the WinCE operating system, and Streammaster utilizes either the MicroWare or the Open TV operating system.

In step S1306, CHE application 22 obtains a printer driver that is appropriate for the manufacturer and model of printer 12 and for the hardware type and operating system of STB 10. CHE application 22 may obtain this printer driver from one of many sources. For example, the needed printer driver may already be stored in a memory of CHE 6 and accessible via preferences directory 21 for another subscriber on the digital cable network. In the alternative, CHE 6 may have several printer drivers available in a memory device such as a hard drive, CDROM, or the like. In another alternative, CHE application 22 may utilize internet proxy 5 to access world wide web 4 so as to obtain the necessary printer driver for STB 10, such as from the printer manufacturer's web site. Once the appropriate printer driver is found by CHE application 22, CHE application 22 then sends the printer driver to STB 10 via the digital cable network (step S1307). As mentioned previously, any of the available transport protocols for communication between CHE 6 and STB 10 may be utilized to download the printer driver from CHE 6 to STB 10. Once STB 10 receives the printer driver, STB 10 loads the printer driver in local memory for subsequent use and registers the printer driver with operating system 32 of STB 10 for future reference (step S1308).

In step S1309, CHE 6 obtains another printer driver for use by CHE 6 to send print data to STB 10. CHE 6 determines which printer driver to obtain for its own use based upon the information describing printer 12 provided by STB 10 and based upon the type of hardware and operating system which comprise CHE 6. As described above, CHE 6 may obtain the printer driver from any one of several resources, such as world wide web 4. CHE application 22 updates preferences directory 21 so as to record the new printer driver that corresponds to printer 12 for use by CHE 6 (step S1310). In this manner, CHE 6 maintains a printer driver which corresponds to printer 12 so that CHE 6 may render print data appropriately the next time print data is provided from CHE 6 to STB 10 for printing on printer 12. In addition, this feature of the present invention also provides an easy and transparent plug-and-play mechanism for the user of STB 10 to connect and utilize printer 12 to STB 10.

It is emphasized that several changes and modifications may be applied to the above-described embodiments, without departing from the teaching of the invention. It is intended that all matter contained in the present disclosure, or shown in the accompanying drawings, shall be interpreted as illustrative rather than limiting. In particular, it is to be understood that any combination of the foregoing embodiments may be utilized, so that the specifics of any one embodiment may be combined with any of the other or several other embodiments.

What is claimed is:

1. A method for providing for printout of an internet-based print job at a printer connected to an information processing device, a server connected to a plurality of information processing devices executes the steps of:

receiving from an internet-based source a push-print print job to be printed at a printer connected to an information processing device via a network, wherein the print job includes data associated with, and specific to, a user of the information processing device;

determining whether to accept the print job received from the internet-based source based on profile information associated with the user, and performing the following steps based on the determination:

obtaining a print driver for the printer connected to the information processing device;

rendering the print job using the print driver; and transferring the rendered print job over the network to the information processing device.

2. A method according to claim 1, further comprising the steps of instructing the information processing device to create a logical printer with a simplified print driver that accepts rendered print jobs, and accepting the rendered print job by the logical printer for visual printout.

3. A method according to claim 1, further comprising the steps of establishing a secure connection to the internet-based source.

4. A method according to claim 1, further comprising the steps of establishing a secure connection to the information processing device.

5. A method according to claim 1, wherein the step of rendering the print job generates rasterized data using the print driver.

6. A method according to claim 1, wherein the information processing device is a set top box, the network is a broadband network, and the server is a cable head end.

7. A method according to claim 1, wherein the data is generated based on a request from the user of the information processing device.

8. A method according to claim 1, further comprising the steps of automatically detecting information for the type and configuration of the printer connected to the information processing device, by requesting such information from the information processing device, and thereafter automatically obtaining a suitable print driver.

9. A method according to claim 1, wherein the rendered print job includes all needed printer commands for the target printer.

10. A method according to claim 9, wherein the rasterized bit map print data is formatted to a format needed by the target printer.

11. A server for providing for printout of an internet-based print job at a printer connected to an information processing device, in which the information processing device is connected to the server via a network, comprising:

a program memory for storing process steps executable to perform a method according to any of claims 1 to 8, 3 to 6 and 7; and a processor for executing the process steps stored in said program memory.

12. Computer-executable process steps stored on a computer-readable medium, said computer-executable process steps for providing for printout of an internet-based print job at a printer connected to an information processing device, in which a server is connected to the information processing device via a network, said computer-executable process steps comprising process steps executable to perform a method according to any of claims 1 to 8, 3 to 6 and 7.

13. A computer-readable medium which stores computer-executable process steps, the computer-executable process steps for providing for printout of an internet-based print job at a printer connected to an information processing device, in which a server is connected to the information processing device via a network, said computer-executable process steps comprising process steps executable to perform a method according to any of claims 1 to 8, 3 to 6 and 7.

* * * * *

UNITED STATES PATENT AND TRADEMARK OFFICE
CERTIFICATE OF CORRECTION

PATENT NO.      : 7,084,994 B1
APPLICATION NO. : 09/357585
DATED           : August 1, 2006
INVENTOR(S)     : George Koppich et al.

It is certified that error appears in the above-identified patent and that said Letters Patent is hereby corrected as shown below:

<u>COLUMN 1</u>
    Line 45, "connecte" should read --connected--.

<u>COLUMN 2</u>
    Line 15, "can not" should read --cannot--.

<u>COLUMN 4</u>
    Line 50, "proxy S." should read --proxy 5--.

<u>COLUMN 5</u>
    Line 23, "it" should read --is--.

<u>COLUMN 6</u>
    Line 23, "STE" should read --STB--

<u>COLUMN 7</u>
    Line 60, "turn-is" should read --turn is--.

<u>COLUMN 10</u>
    Line 41, "the-elimination" should read --the elimination--.

<u>COLUMN 14</u>
    Line 4, "is" should be deleted;
    Line 7, "in" should be deleted; and
    Line 45, "invention-is" should read --invention is--.

<u>COLUMN 16</u>
    Line 17, "form" should read --from--.

<u>COLUMN 19</u>
    Line 46, "steps" should read --step--.

UNITED STATES PATENT AND TRADEMARK OFFICE
CERTIFICATE OF CORRECTION

PATENT NO. : 7,084,994 B1
APPLICATION NO. : 09/357585
DATED : August 1, 2006
INVENTOR(S) : George Koppich et al.

It is certified that error appears in the above-identified patent and that said Letters Patent is hereby corrected as shown below:

COLUMN 20
    Line 25, "claims 1 to 8, 3" should read --claims 1 to 8;--;
    Line 26, "to 6 and 7;" should be deleted;
    Line 36, "claims 1 to 8, 3 to 6 and" should read --claims 1 to 8.--;
    Line 37, "7." should be deleted; and
    Line 45, "claims 1 to 8, 3 to 6 and 7." should read --claims 1 to 8.--.

Signed and Sealed this

Twenty-second Day of May, 2007

JON W. DUDAS
*Director of the United States Patent and Trademark Office*